US008838540B2

(12) United States Patent
Meehan et al.

(10) Patent No.: US 8,838,540 B2
(45) Date of Patent: Sep. 16, 2014

(54) SYSTEM AND METHOD FOR PROVIDING RECOGNIZED OFFLINE MODIFICATION OF A VIRTUAL ASSET (75) Inventors: Patrick Carson Meehan, Seattle, WA (US); Scott Charles Dodson, Seattle, WA (US); Elias C. Alvord, Seattle, WA (US); Jeremy A. Irish, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 1039 days.

(21) Appl. No.: 12/319,118

(22) Filed: Dec. 31, 2008

(65) Prior Publication Data

US 2009/0177717 A1 Jul. 9, 2009

Related U.S. Application Data (60) Provisional application No. 61/010,128, filed on Jan. 3, 2008.

(51) Int. Cl.
*G06F 17/30* (2006.01)
*H04L 29/06* (2006.01)
*A63F 13/30* (2014.01)

(52) U.S. Cl.
CPC ....... *H04L 63/0823* (2013.01); *A63F 2300/575* (2013.01); *A63F 13/12* (2013.01); *A63F 2300/532* (2013.01); *A04L 63/12* (2013.01)
USPC ........... 707/640; 707/641; 707/644; 707/661; 707/682

(58) Field of Classification Search
CPC ... H04L 12/1827; H04L 65/605; H04L 67/38; H04L 63/0227; H04L 63/0218; H04L 63/08; H04L 63/1441; H04L 67/10; H04L 2209/56; H04L 2209/60; H04L 2463/101; H04L 63/0823; H04L 63/104; H04L 63/12
See application file for complete search history.

(56) References Cited

U.S. PATENT DOCUMENTS

| | | | |
|---|---|---|---|
| 2007/0050467 A1* | 3/2007 | Borrett et al. | 709/213 |
| 2007/0111784 A1* | 5/2007 | Van Luchene | 463/23 |
| 2008/0167129 A1* | 7/2008 | Aaron et al. | 463/42 |
| 2008/0195576 A1* | 8/2008 | Sande et al. | 707/2 |
| 2008/0262969 A1* | 10/2008 | Samid | 705/64 |
| 2008/0319656 A1* | 12/2008 | Irish | 701/208 |
| 2008/0320089 A1* | 12/2008 | Jung et al. | 709/206 |
| 2009/0170604 A1* | 7/2009 | Mueller et al. | 463/42 |

* cited by examiner

*Primary Examiner* — Shyue Jiunn Hwa
(74) *Attorney, Agent, or Firm* — Patrick J. S. Inouye; Krista A. Wittman (57) ABSTRACT

A computer-implemented system and method for providing recognized offline modification of a virtual asset are provided. A virtual asset that includes parameters that each have intrinsic significance within a virtual environment defined exclusively by a central server is identified. Qualitative rules including characteristics of the parameters are defined. The virtual asset is stored on storage media offline from the central server. Proposed changes to at least one of the parameters of the virtual asset applied by a client application are maintained and are stored on the storage media. The virtual asset is authenticated on behalf of the central server through an asset authority. When authenticated, each proposed change is evaluated against the characteristics of the parameters as defined in the qualitative rules and only those proposed changes that are satisfactory are accepted.

16 Claims, 5 Drawing Sheets

SYSTEM AND METHOD FOR PROVIDING RECOGNIZED OFFLINE MODIFICATION OF A VIRTUAL ASSET

CROSS-REFERENCE TO RELATED APPLICATION

This non-provisional patent application claims priority under 35 U.S.C. §119(e) to U.S. Provisional Patent application Ser. No. 61/010,128, filed Jan. 3, 2008, the disclosure of which is incorporated by reference.

FIELD

The invention relates in general to virtual assets and, specifically, to a system and method for providing recognized offline modification of a virtual asset.

BACKGROUND

Virtual assets are emerging as a powerful feature of online programs and games, Web portals, and other services. A virtual asset is a virtualized object maintained as an electronically-stored digital file in an online environment, which is often configured in a client-server typology. Virtual assets include objects that are actively played, such as characters to participate in online games, frequently massively multiplayer online role-playing games, like the World of Warcraft game, and avatars to experience online virtual worlds, such as the Second Life program. Virtual assets also include inanimate objects that are changed through use, such as an online log that records physical tokens that have been discovered in the real world by a user through, for instance, Geocaching treasure hunting, or a soft downloadable play cartridge, which dictates and tracks a user's progress through a virtualized exploration scenario that requires undertaking real world interaction and puzzle-solving, such as a Waymarking scavenger hunt.

A virtual asset has intrinsic significance to the owner within, and sometimes outside of, the context of the online environment. A virtual asset accumulates value through the actions taken by an owner within the online environment, which functions as a value driver that enhances the virtual asset through use. The owner builds equity in the virtual asset by investing time and money, frequently through an online subscription. The online environment provides a context for use of the virtual asset and offers differing levels of value.

Virtual assets are intended to be highly personalizable, configurable, and valuable. For safety, online environments ordinarily provide virtual assets with security characteristics, such as a user name and password uniquely matched to each user. As well, virtual assets tend to be stored in a digital format proprietary to the online environment's publisher, who also regulates the use and alteration of virtual assets through licenses and use policies. Often, the only way to modify a virtual asset is via an online server run by the publisher. Virtual assets physically reside in server-controlled databases and are thus server-bound. A virtual asset owner must be online to interact with and effect any changes to his virtual asset.

Change, though, can increase, or sometimes decrease, the value or significance of a virtual asset to both the user and other participants of the online environment, and the value can sometimes be reflected as real world value. The changes are necessarily domain-dependent, such as acquisitions to character inventory, increases in skill level, experience points, and so forth. As the usage, and hence the ability to change or enhance the value, of a virtual asset remains locked into the online environment, owners are effectively precluded from copying or distributing their virtual assets outside the online environment, as offline changes by third party applications are not recognized by the online server.

The inability to change a virtual asset outside of the online environment suggests that a virtual asset's value can become artificially stagnant. Offline and third party applications are unable to change a virtual asset. Every virtual asset user is tied to having a network-available connection to reach the publisher's server, which can smother value-enhancing opportunities, particularly where the user is willing to pay for offline use. As well, offline changes to a virtual asset could beneficially incentivize a user to return to an online environment if offline usage could just be recognized when the virtual asset is later re-introduced.

SUMMARY

One embodiment provides a computer-implemented system and method for providing recognized offline modification of a virtual asset. A virtual asset that includes parameters that each have intrinsic significance within a virtual environment defined exclusively by a central server is identified. Qualitative rules including characteristics of the parameters are defined. The virtual asset is stored on storage media offline from the central server. Proposed changes to at least one of the parameters of the virtual asset applied by a client application are maintained and are stored on the storage media The virtual asset is authenticated on behalf of the central server through an asset authority. When authenticated, each proposed change is evaluated against the characteristics of the parameters as defined in the qualitative rules and only those proposed changes that are satisfactory are accepted.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

The following terms are used throughout and, unless indicated otherwise, have the following meanings:

Virtual Asset: A virtualized object containing parameters and which is represented by one or more digital files residing on any server, server-bound storage device, or distributed over a system of servers and storage devices.

Transaction: Any event in which a virtual asset is inspected, manipulated, or changed.

User: An individual registered to perform transactions on a virtual asset, or who is in possession of storage media storing an offline copy of a virtual asset.

Publisher: The originator of a virtual asset. A publisher usually owns and controls an asset authority and may offer one or more value drivers to users.

Asset Authority: A trusted server used to accept secure transactions on an offline virtual asset. Trust is delegated to the asset authority from a publisher.

Trusted Source: A trusted client application used to perform secure transactions on an offline virtual asset. Trust is delegated to the client application from an asset authority.

Trust Hierarchy: A hierarchical arrangement of successive levels of trust. A publisher is held to a higher level of trust than an asset authority. Similarly, an asset authority is held to a higher level of trust than a trusted source.

Certificate of Authenticity (CoA): An electronically-stored document issued by an asset authority to a trusted source that is used to authenticate an offline virtual asset. The CoA can include a digital signature generated by the asset authority. Client applications use an offline virtual asset's CoA for authentication. The CoA protects all attributes of the offline virtual asset that require approval by the asset authority.

Rules: Any kind of logical construct, algorithm, methodology, or heuristic used to evaluate an offline virtual asset using domain knowledge about types and contexts of virtual assets.

Canonical Changes: Any changes to an offline virtual asset defined as logical and meaningful by an asset authority.

Authorized Changes: Any changes to an offline virtual asset that have been proposed by a trusted party. Authorized changes are expected to be canonical changes, while unauthorized changes, whether canonical, are deemed illicit and rejected.

Client Applications: Any offline application originating with an asset authority or any application, either online or offline, maintained by a third party. A client application can include a non-trusted client application. Client applications are executed on clients, which are generally trusted sources.

Offline Transactions with Virtual Assets

Figure 1:
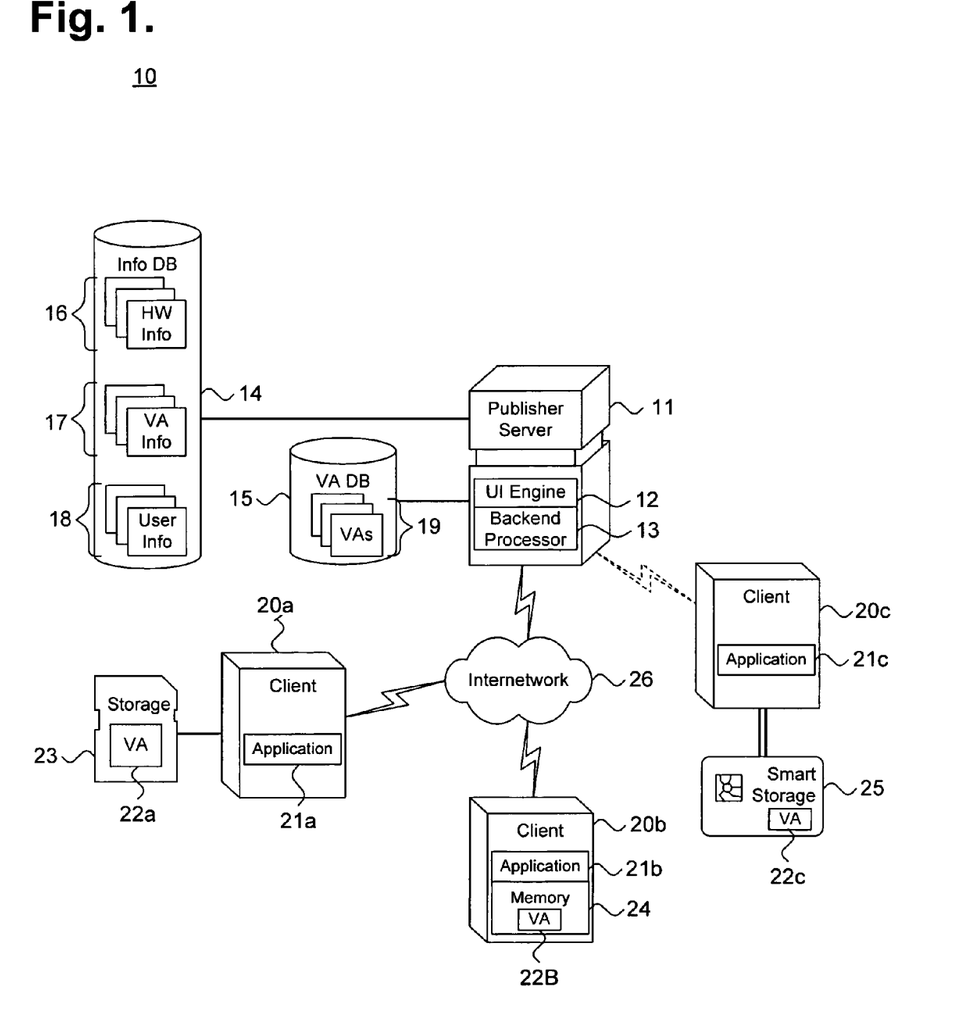
FIG. 1 is a functional block diagram showing a system for providing recognized offline modification of a virtual asset, in accordance with one embodiment.

Conventional systems that provide virtual asset assume that the virtual assets will reside on centralized servers and will only be manipulated by online applications trusted to interact directly with an asset authority. By supplementing such systems with appropriate safeguards, entire virtual assets or some portions thereof, may be stored and modified offline from centralized servers. FIG. 1 is a functional block diagram showing a system 10 for providing recognized offline modification of a virtual asset, in accordance with one embodiment. A publisher server 11 is remotely interconnected to one or more clients 20a-c over an internetwork 26, such as the Internet. The interconnection can be wired or wireless and provided full-time or as a transient connection, such as by using a wireless access point.

The publisher server 11 includes a user interface engine 12 and backend processor 13, which respectively provide a user interface to each of the clients 20a-c through locally-executed client applications 21a-c and processing of an online environment that drives value to the publisher. Online environments include online programs and games, Web portals, and other services. The publisher server 11 maintains a database 15 in which virtual assets 19 are centrally stored for users to access via their client applications 21a-c. The publisher server 11 also maintains a database 14 of hardware information 16, virtual asset information 17, and user information 18. The user information 18 may include account information, such as username and password, and may be protected using security measures, such as encryption, password hashes, and so forth. Other databases and information storage could be used.

The virtual assets 19 can be represented in a decentralized or offline manner and may be transacted upon by a client application 21a-c. Authorized copies of the virtual assets 19, or simply, offline virtual assets 22a-c, are remotely maintained on a storage device offline from the publisher server 11, which is controlled by the user to whom the virtual asset 19 belongs. Offline storage devices include, for instance, portable storage media 23, memory 24 local to the client 20b, and smart storage devices 25, such as Smart Cards with limited onboard processing logic. Other offline storage devices could be used.

Figure 2:
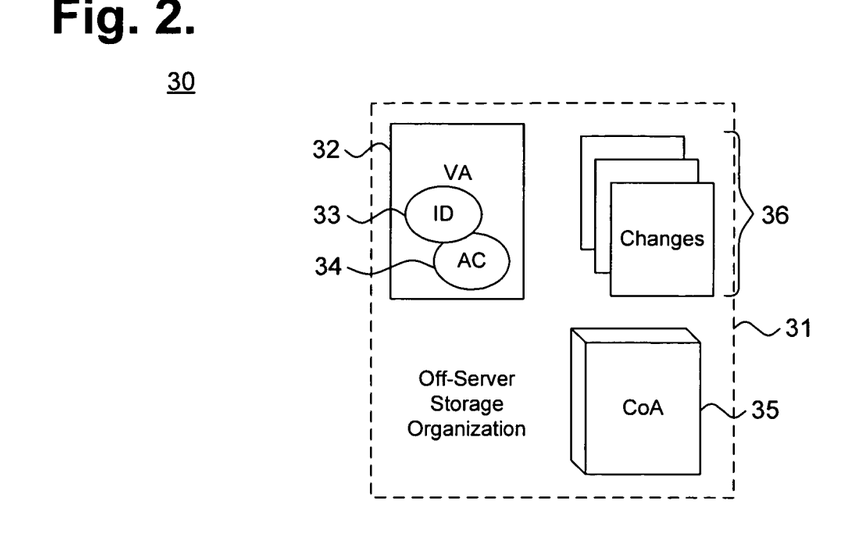
FIG. 2 is a block diagram showing off-server storage of a virtual asset for use with the system of FIG. 1.

The offline virtual assets 22a-c each include safeguards that ensure valid off-server storage. FIG. 2 is a block diagram showing off-server storage 30 of a virtual asset 32 for use with the system 10 of FIG. 1. On each offline storage device 23-25, off-server storage uses an organization 31, in which an offline copy of the virtual asset 32 is stored, along with any changes 36 that have been made and a CoA 35. Each offline virtual asset 32 includes a unique identifier 33 and an authentication code 34, which are stored as part of the virtual asset. The unique identifier 33, authentication code 34, and CoA 35 are further described infra.

Referring back to FIG. 1, through the client applications 21a-c, users can interact with and legitimately change their virtual assets 22a-c as maintained on their offline storage devices 23-25. The client applications 21a-c include both applications provided by a publisher for operating offline from the publisher server 11 and third party applications authorized by the publisher for operating either offline from or collaboratively online with the publisher server 11.

The publisher server 11 is a server-class computing platform, while the clients 20a-c are either general purpose or specialized computing devices, including fully-functioned personal computers, thin client personal computers, Web-enabled devices, and programmable mobile devices. Other server platforms and client computing devices could be used. Each client 20a-c includes facilities to accommodate at least one form of offline storage device 23-25 and are preferably, but need not mandatorily be, remotely connectable to the publisher server 11. Both the publisher server 11 and the clients 20a-c include components conventionally found in programmable computing devices, such as a central processing unit, onboard memory, input/output ports, network interfaces, if applicable, and non-volatile storage, although other components are possible.

Authentication of Virtual Assets

Figure 3:
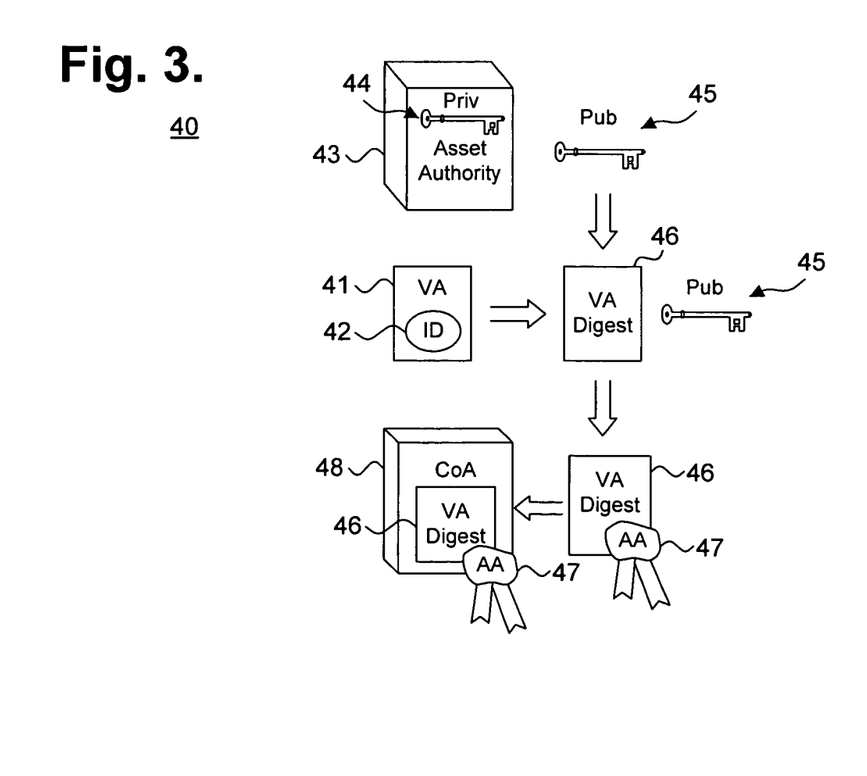
FIG. 3 is a functional block diagram showing generation of a certificate of authenticity for a virtual asset.

The value of a virtual asset is driven by the client applications 21a-c (shown in FIG. 1) that provide context for the asset. These applications authenticate virtual assets based on approval from an asset authority. Illegitimate assets are rejected and therefore valueless. FIG. 3 is a functional block diagram showing generation 40 of a certificate of authenticity 48 for a virtual asset 41. Approval from an asset authority 43 is indicated by the issuance of the CoA 48, which may be stored offline for later authentication.

The asset authority 43 maintains set of rules for validating virtual assets and approves valid assets by issuing a CoA 48, which serves as a record of approval for an offline virtual asset 32. The CoA 48 is used to authenticate offline virtual assets 32 following use by an client application 21a-c. Each CoA 48 includes one or more digital signatures from the asset authority 43. A digest 46 of the virtual asset 41, including any unique identifier 42 previously assigned, is formed and the asset authority 43 affixes a digital signature 47 to the digest 46. The digest 46 and affixed digital signature 47 are then placed into the CoA 48. The CoA 48 is then stored locally with each offline virtual asset 32. Each client application 21a-c authenticates the offline virtual asset 32 following the same procedures to first generate a digest, and then comparing the digest to the signed digest 46 contained in the CoA 48.

The client applications 21a-c can make changes to the offline virtual asset 43 and the legitimacy of the changes are tied to the authentication of the CoA 48. The asset authority 43 first validates the offline virtual asset 32 using the original CoA 48 before making any changes that would necessitate the issuance of a new CoA 48 for the virtual asset to continue to be valid. As a result, to validate the original CoA 48, the asset authority maintains the original virtual asset 19 (shown in FIG. 1) as used in generating the CoA 48. The client application 21a-c is then authenticated by checking current state of offline virtual asset 32 against the CoA 48.

Public key encryption system can be used to provide authentication of virtual assets 41. The asset authority 43 generates a private key 44 that is always held secret by the asset authority 43, and a public key 45, which is distributed to clients 20a-c. A digital signature 47 is generated by the asset authority 43 using the private key 44 and is authenticated by each client application 21a-c using the public key 45. Other forms of encryption and authentication could be used.

Registration of Virtual Assets

Security operations are only possible if an asset authority 43 can uniquely identify and store persistent information about a virtual asset. As a result, each virtual asset 41 is individually registered with the asset authority 43, which issues a unique identifier 42 that is recorded by the publisher server 11 as virtual asset information 17 and persistently stored in the information database 14 (shown in FIG. 1). Registration includes associating a unique identifier 42 with the virtual asset 41 to enable the asset authority 43 to track the virtual asset 41. The virtual asset information 17 is not available to any of the client 20a-c. Each unique identifier 42 is a part of the virtual asset 41 and is protected by the CoA 48 by including the unique identifier 42 in the generation of the digest 46.

Protection of Non-Canonical Changes to Virtual Assets

Figure 4:
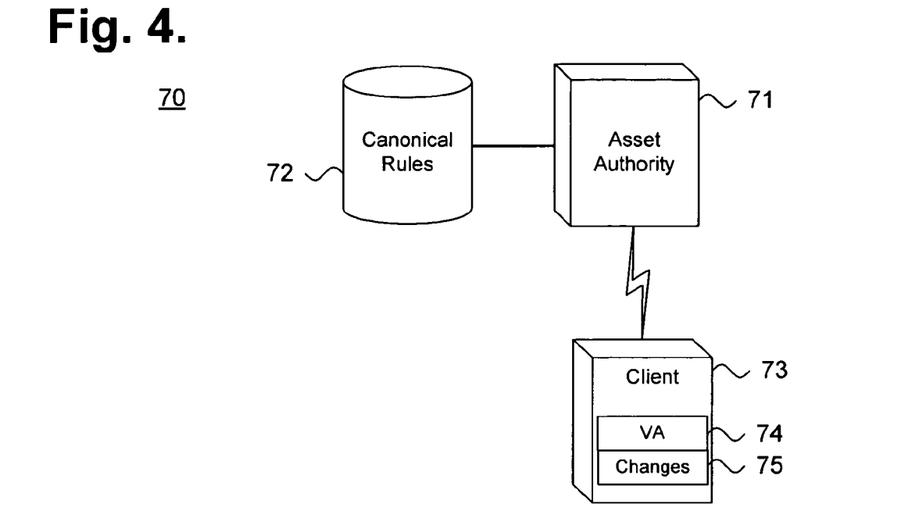
FIG. 4 is a functional block diagram showing identification of canonical changes to a virtual asset.

A typical attack on a virtual asset will be an attempt by a user to make non-canonical changes to the virtual asset. FIG. 4 is a functional block diagram showing identification 70 of canonical changes to a virtual asset 74. Each asset authority 71 protects against non-canonical changes by maintaining a set of canonical rules 72, which are used to detect non-canonical changes. The asset authority 71 withholds approval any client 73 requesting non-canonical changes to an offline virtual asset 74.

All changes 75 to an offline virtual asset 74 made by a client application 21a-c are stored offline by the respective client 20a-c and later submitted to an asset authority 71 as proposed changes pending approval. The asset authority 71 maintains a list of canonical rules 72 for identifying non-canonical changes. Each canonical rule 72 specifies qualitative characteristics for each of the parameters in the virtual asset. The canonical rules 72 including checking the age of any CoA, license, or other express authorization and evaluating the quantity and nature of changes or transactions proposed. Each canonical rule 72 is domain-dependent based on the virtual online environment provided by the publisher server 11. For instance, in an online game scenario, a proposed change to the offline virtual asset 74 attempting to move a player's character from entry level to advanced after only an hour's worth of offline game play might be rejected as qualitatively implausible.

More particularly, each client application 21a-c interacts with the offline virtual asset 74 and generates proposed changes 75, which are locally stored. The changes 75 may be stored as deltas on the original offline virtual asset 74, or may be stored as copy of the original offline virtual asset 74 with the changes already applied. From a user interface perspective, the client application 21a-c presents the offline virtual asset 74 to the user as though the changes 75 have already been applied so that the evolution of the virtual asset appears immediately.

The stored changes 75 are later sent to the asset authority 71 for approval. The asset authority 71 may maintain its own copy of the virtual asset for comparison to the changed offline virtual asset 74 or the proposed changes 75. Alternatively, if the asset authority 71 does not maintain its own copy, the asset authority 71 may require the client 73 to send a copy of the original virtual asset prior to any changes. The asset authority 71 then validates the proposed changes 75 using the set of canonical rules 72. If validated, the asset authority 71 may then re-issue a new version of the approved virtual asset, issue a new CoA 48 for the virtual asset to include the changes, update the asset authority's local copy of the virtual asset, if any, or request the client application 21a-c to perform actions on the offline virtual asset 74 directly, such as updating, overwriting, rolling back, erasing, and so forth.

Protection Against Unauthorized Canonical Changes to Virtual Assets

Figure 5:
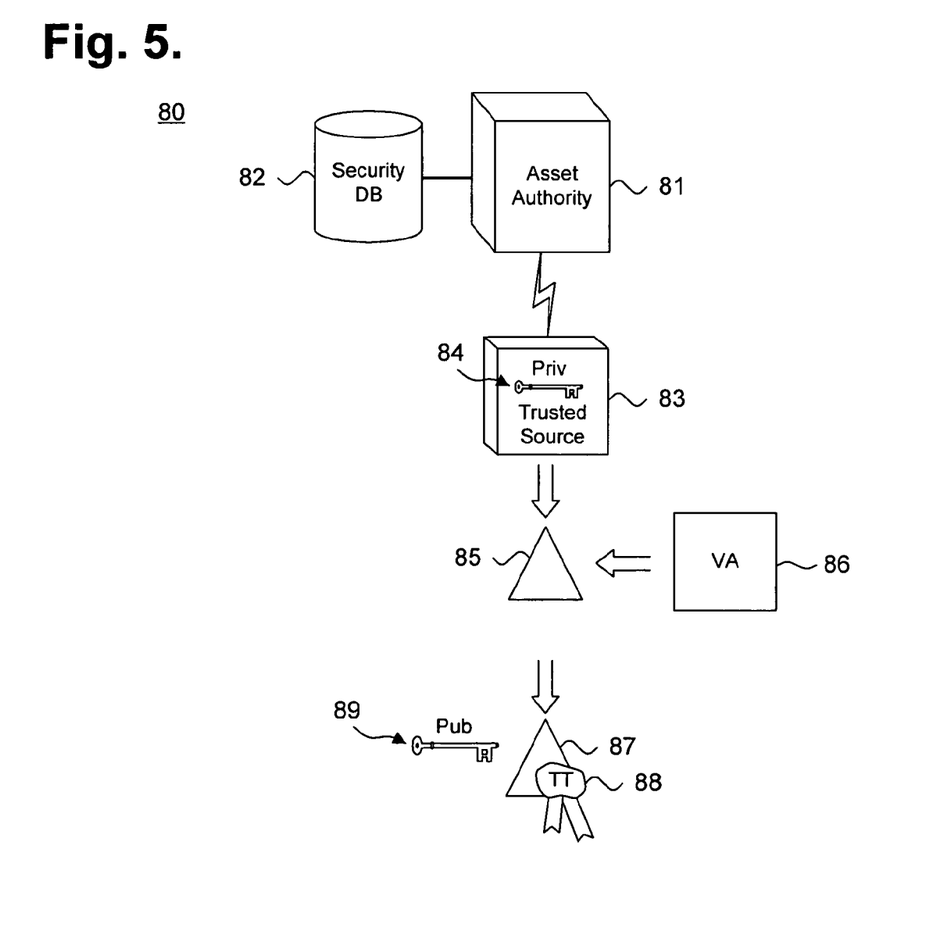
FIG. 5 is a functional block diagram showing identification of unauthorized changes to a virtual asset.

An attack is possible in which a user makes unauthorized changes to an offline virtual asset. The changes could be canonical or non-canonical. FIG. 5 is a functional block diagram showing identification 80 of unauthorized changes to a virtual asset. The asset authority 81 protects against unauthorized changes by requiring all proposed changes 85 to be digitally signed or otherwise shown to originate from a trusted source 83, which is normally a client 20a-c that is executing an authorized client application 21a-c. Trusted sources 83 can be identified by the digital signatures 88, which are affixed to proposed changes 87.

An asset authority 81 grants licenses or permissions to client applications 21a-c, which can include client applications provided by third parties, for the purpose of later identifying proposed changes 85 to an offline virtual asset 86. Licenses and permissions may include or be based upon digital certificates (not shown) issued by the asset authority 81 or by a trusted third party (not shown). Licenses and permissions to trusted sources 83 may be issued online, preloaded onto clients 20a-c at point of manufacture, or securely published to clients 20a-c. As well, each license or permission can include any data relevant to the asset authority 81 or individual trusted sources 83 regarding authorized modifications of offline virtual assets 86. Client applications 21a-c provide notification to the user regarding the current state of the license or permissions granted by the asset authority 81, including warning the user about their expiration.

The asset authority 81 maintains a secure database 82 storing each digital certificate, license, and permission issued to trusted sources 83. Using the database 82, the asset authority 81 can identify any expired license or permission using a configurable set of rules to check parameters, such as the age of the certificate, license, or permission, and the quantity and nature of changes proposed by the client 73. All proposed changes 85 to an offline virtual asset 86 must be digitally signed or otherwise shown to originate from a trusted source 83. When an asset authority 81 is requested to review and apply proposed changes 85 to an offline virtual asset 86, the asset authority 81 detects and rejects any of the proposed changes 85 that are not authorized, whether canonical, by the license or permission granted by the asset authority 81.

Public key encryption system can also be used to provide authentication of a client who is also a trusted source 83. The trusted source 83 generates a private key 84 that is always held secret by the trusted source 83, and a public key 89, which is distributed to the asset authority 81. A digital signature 88 is generated by the trusted source 83 using the private key 84 and is authenticated by the asset authority 81 using the public key 89. Other forms of encryption and authentication could be used.

Protection Against Unauthorized Copying of Offline Virtual Assets

Figure 6:
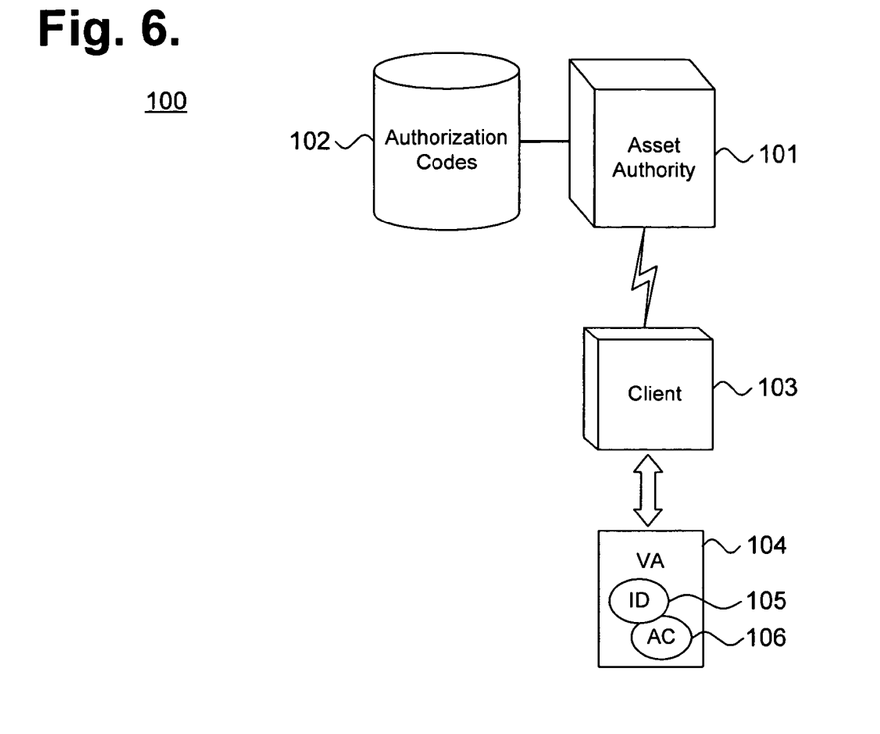
FIG. 6 is a functional block diagram showing identification of a non-unique virtual asset.

An attack is possible in which offline virtual assets are copied and distributed to multiple users. FIG. 6 is a functional block diagram showing identification 100 of a non-unique virtual asset. Each offline virtual asset 104 is registered with an asset authority 101 and includes and present an authorization code 106 that must be presented with all transactions for approval. The authorization code 106 may by any identifier chosen by an asset authority 101, including a timestamp within, a digest of the offline virtual asset following updating, a random number, or the offline virtual asset itself.

The authorization code 106 is frequently changed by the asset authority 101, thereby hindering attempted illicit synchronization across multiple copies of the same offline virtual asset. The issuance of an authorization code 106 required for future transactions on offline virtual assets 104. The asset authority 101 maintains a database 102 storing the authorization codes issued for known offline virtual assets 104. The authorization code 106, as well as the unique identifier 105, are part of the offline virtual asset 104 and are protected by a CoA 48, as discussed supra with reference to FIG. 3, although the authorization code 106 could be securely stored separately from the offline virtual asset 104.

The asset authority 101 generates new authorization codes as transactions are performed on an offline virtual asset 104, including authentication. The authorization codes 106 may be updated with every transaction, or at some arbitrary interval. The asset authority 101 issues the offline virtual asset's authorization code 106 to the client application executing on a client 103, which stores the authorization code 106 for future use.

The asset authority 101 may detect duplicate or invalid offline virtual assets by requesting a current authorization code 106 from a client 103 and by comparing the authorization code provided to the authorization code locally stored in the database 102. If the authorization code provided does not match, the offline virtual asset suffered tampering or is a presumably illicit and unauthorized copy of a previously approved version of the offline virtual asset.

Method

Figure 7:
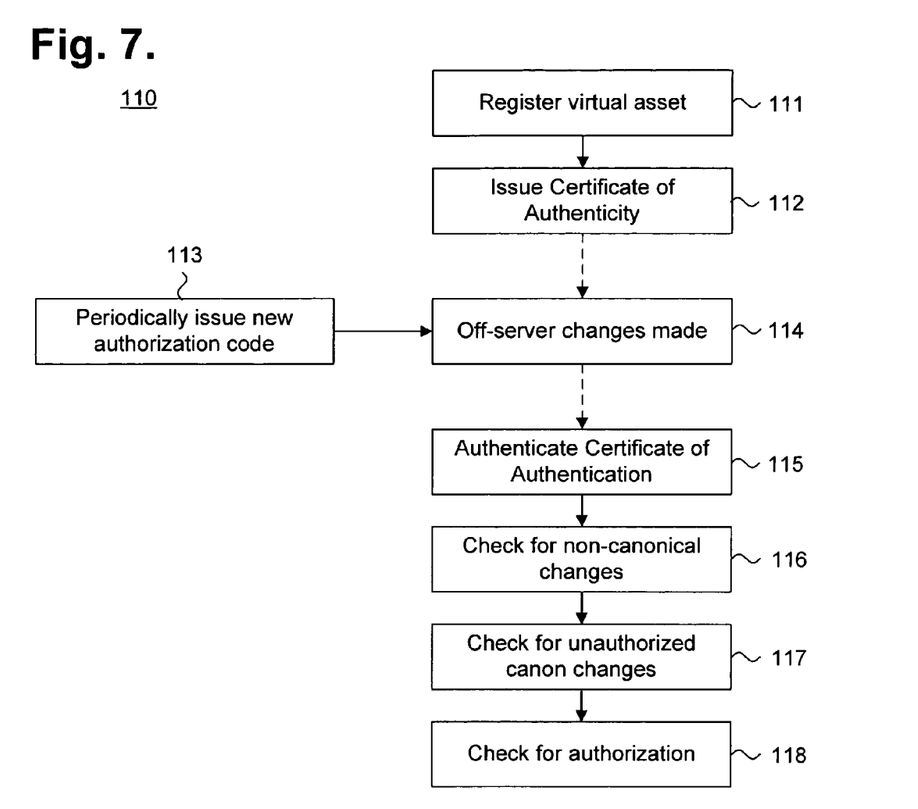
FIG. 7 is a flow diagram showing a method for providing recognized offline modification of a virtual asset, in accordance with one embodiment.

The overall provisioning of safeguards to protect offline virtual assets or some portions thereof enable entire virtual assets or some portions thereof, to be stored and modified offline from centralized servers. FIG. 7 is a flow diagram showing a method 110 for providing recognized offline modification of a virtual asset, in accordance with one embodiment. The method is performed as a series of process steps or operations executed by an asset authority and one or more client applications.

Prior to issuing an authorized offline virtual asset, an asset authority must prepare the virtual asset (steps 111-113). Initially, the asset authority registers the virtual asset (step 111) by assigning a unique identifier and an authorization code, which are preferably stored as part of the offline virtual asset. The asset authority then issues a CoA (step 112) that is included with the offline virtual asset. As required, the asset authority reissues an authorization code and, if needed, a new CoA (step 113).

A client application executing on client that is a trusted source accesses and can make changes to the offline virtual asset (step 114). The changes are either maintained separately from the offline virtual asset or applied to a copy.

Proposed changes require approval by the asset authority before being accepted (steps 115-118). Each proposed change is first authenticated by the asset authority by evaluating the CoA (step 116). The proposed changes are then checked for conformity to canonical rules (step 116), which are specifically authorized (step 117). Finally, the authorization code periodically provided to the offline virtual asset is checked (step 118).

Binding Virtual Assets to Storage Devices or Hardware Key

In a further embodiment, to further dissuade the casual copying and distribution of virtual assets and to provide a tangible measure of authenticity, each offline virtual asset can be bound to a specific storage device or hardware key. The device or key is securely recorded by the publisher server 11 as hardware information 16 and persistently stored in the information database 14 (shown in FIG. 1). The device or key represents a tangible manifestation of the offline virtual asset in the real world, and may be used to sell or trade the asset. The device or key is required to be present for all changes or transactions performed on the offline virtual asset. Client applications automatically reject the authenticity of an offline virtual asset if the proper hardware key is not provided.

Viable storage devices include computers, cellular or mobile telephones, hard drives, thumb drives, electronically erasable programmable read-only memory (EEPROM). Hardware keys, such as smart storage devices, must be able to present a uniquely identifying code or information that cannot be trivially copied by end user. A client application presents the hardware key to an asset authority when requesting approval of proposed changes, thereby indicating that specific hardware is present. The hardware identifier can also be protected by a CoA, like any other attribute of the offline virtual asset.

In a still further embodiment, offline virtual assets are limited to specific storage devices or hardware keys, which are known to an asset authority ahead of time, such as at the point of manufacture, prior to sale to an end user, or pre-loaded onto a storage device.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for providing recognized offline modification of a virtual asset, comprising:
 a database, comprising:

at least one virtual asset comprising parameters that each have intrinsic significance within a virtual environment defined exclusively by a central server;
a certificate of authenticity assigned to the virtual asset and comprising a digest of the virtual asset and a digital signature by an asset authority; and
qualitative rules comprising characteristics of the parameters of the virtual asset;
storage media offline from the central server, comprising:
a copy of the virtual asset and the certificate of authenticity; and
proposed changes to at least one of the parameters of the virtual asset applied by a client application and stored on the storage media; and
the asset authority, comprising
an authentication module authenticating the virtual asset on behalf of the central server via the certificate of authenticity;
an authorization code periodically issued to the virtual asset from the asset authority, wherein the authorization code is checked for expiration against authentication code information maintained by the asset authority; and
an evaluation module evaluating each proposed change, when authenticated, against the characteristics of the parameters as defined in the qualitative rules and determining whether the proposed changes are satisfactory based on the evaluation of the proposed changes and the characteristics of the parameters,
wherein only those proposed changes that are satisfactory are accepted.

2. A system according to claim 1, further comprising:
a unique identifier registered to the virtual asset on the central server; and
a copy of the unique identifier stored as part of the virtual asset on the storage media,
wherein the unique identifier is verified by the evaluation module against virtual asset information maintained by the asset authority.

3. A system according to claim 1, further comprising:
within the qualitative rules, canonical changes that are applicable to the parameters comprised in the virtual asset,
wherein each proposed change is matched to the canonical change of the matching parameter, and any such proposed change that fails to match one or more of the canonical changes is rejected.

4. A system according to claim 3, further comprising:
one or more of the canonical changes defined as permissible by the client application,
wherein any of the proposed changes that fail as one or more of the authorized canonical changes are rejected.

5. A system according to claim 1, further comprising:
a copy of the authorization code stored as part of the virtual asset on the storage media.

6. A system according to claim 1, further comprising:
a user identifier registered to the virtual asset on the central server,
wherein user information is accepted by the evaluation module during authentication, and the user information is verified by the evaluation module against the user identifier maintained by the asset authority.

7. A system according to claim 1, further comprising:
a unique identifier bound to the storage media comprising tamper resistant features.

8. A system according to claim 1, further comprising:
a trust hierarchy comprising:
a highest level of trust for the virtual asset to the central server; and
levels of trust under the highest trust level to one or more delegated trust authorities,
wherein any of the proposed changes that originate from a client application that is not one of the delegated trust authorities are rejected.

9. A computer-implemented method for providing recognized offline modification of a virtual asset, comprising:
identifying a virtual asset comprising parameters that each have intrinsic significance within a virtual environment defined exclusively by a central server;
defining qualitative rules comprising characteristics of the parameters;
generating a certificate of authenticity comprising a digest of the virtual asset and a digital signature by an asset authority and assigning the certificate of authenticity to the virtual asset;
storing the virtual asset and the certificate of authenticity on storage media offline from the central server;
maintaining proposed changes to at least one of the parameters of the virtual asset applied by a client application and stored on the storage media;
authenticating the virtual asset via the certificate of authenticity on behalf of the central server through the asset authority;
periodically issuing an authorization code to the virtual asset from the asset authority and checking the authorization code for expiration against authentication code information maintained by the asset authority;
when authenticated, evaluating each proposed change against the characteristics of the parameters as defined in the qualitative rules;
determining whether the proposed changes are satisfactory based on the evaluation of the proposed changes and the characteristics of the parameters; and
accepting only those proposed changes that are satisfactory.

10. A method according to claim 9, further comprising:
registering a unique identifier to the virtual asset on the central server;
storing the unique identifier as part of the virtual asset on the storage media; and
verifying the unique identifier against virtual asset information maintained by the asset authority.

11. A method according to claim 9, further comprising:
within the qualitative rules, defining canonical changes that are applicable to the parameters comprised in the virtual asset;
matching each proposed change to the canonical change of the matching parameter; and
rejecting any such proposed change that fails to match one or more of the canonical changes.

12. A method according to claim 11, further comprising:
authorizing one or more of the canonical changes as permissible by the client application; and
rejecting any of the proposed changes that fail as one or more of the authorized canonical changes.

13. A method according to claim 9, further comprising:
storing the authorization code as part of the virtual asset on the storage media.

14. A method according to claim 9, further comprising:
registering a user identifier to the virtual asset on the central server;
accepting user information during authentication; and
verifying the user information against the user identifier maintained by the asset authority.

15. A method according to claim 9, further comprising:
binding a unique identifier to the storage media comprising tamper resistant features.

16. A method according to claim 9, further comprising:
establishing a trust hierarchy comprising:
- assigning a highest level of trust for the virtual asset to the central server; and
- assigning levels of trust under the highest trust level to one or more delegated trust authorities; and rejecting any of the proposed changes that originate from a client application that is not one of the delegated trust authorities.

\* \* \* \* \*